(12) United States Patent
Harve et al.

(10) Patent No.: US 11,497,313 B2
(45) Date of Patent: Nov. 15, 2022

(54) MAGNET, PIN, AND SPRING ASSISTED LOCKABLE HORIZONTALLY AND VERTICALLY ALIGNING ERGONOMIC NOVEL LATCH MECHANISMS

(71) Applicant: Shweta Harve, Plano, TX (US)

(72) Inventors: Shweta Harve, Plano, TX (US);
Fermin Baeza, Bonham, TX (US);
Dimitrios Dardalis, Austin, TX (US)

( * ) Notice: Subject to any disclaimer, the term of this patent is extended or adjusted under 35 U.S.C. 154(b) by 422 days.

(21) Appl. No.: 16/594,048

(22) Filed: Oct. 6, 2019

(65) Prior Publication Data

US 2021/0100363 A1    Apr. 8, 2021

(51) Int. Cl.
*A47B 96/20* (2006.01)
*F16B 1/00* (2006.01)
*F16B 5/06* (2006.01)

(52) U.S. Cl.
CPC ............... *A47B 96/20* (2013.01); *F16B 1/00* (2013.01); *F16B 5/0692* (2013.01); *A47B 2096/209* (2013.01); *F16B 2001/0035* (2013.01)

(58) Field of Classification Search
CPC .... F16B 5/0614; F16B 5/0657; F16B 5/0664; F16B 2001/0035; F16B 2005/0671; A47B 7/00; A47B 7/042; A47B 96/20; E05C 3/00; E05C 3/006; E05C 3/008; E05C 3/02; E05C 3/04; E05C 3/047; E05C 3/048; E05C 19/16; E05C 19/163; E05B 47/0038; E05B 47/004; E05B 47/0046; E05B 47/0047; Y10T 292/0951; Y10T 292/0952; Y10T 292/0953; Y10T 292/0959; Y10T 292/1083; Y10T 292/1084; Y10T 292/108; Y10T 292/1092; Y10T 292/444; Y10T 292/11; Y10T 403/597
USPC ............................... 312/265.5, 140; 403/381
See application file for complete search history.

(56) References Cited

U.S. PATENT DOCUMENTS

| | | | | |
|---|---|---|---|---|
| 5,188,405 A * | 2/1993 | Maccaferri | ........... | E05B 47/004 |
| | | | | 292/210 |
| 7,575,389 B2 * | 8/2009 | Nance | ................ | E05B 47/0045 |
| | | | | 403/DIG. 1 |
| 8,240,942 B2 * | 8/2012 | Baur | .................... | F16B 12/2036 |
| | | | | 403/321 |
| 8,602,465 B2 * | 12/2013 | Holmgren | ........... | E05B 47/0038 |
| | | | | 292/251.5 |
| 9,161,623 B1 * | 10/2015 | Lin | ........................ | F16B 5/0064 |
| 2006/0175842 A1 * | 8/2006 | Saitoh | ................... | E05C 19/163 |
| | | | | 292/251.5 |
| 2020/0068726 A1 * | 2/2020 | Hwang | ................ | H05K 5/0221 |

* cited by examiner

*Primary Examiner* — Joshua T Kennedy

(57) ABSTRACT

A number of magnetically assisted latch mechanisms are presented, where the latching and unlatching action is done with reduced user effort, therefore promoting speed and efficiency without sacrificing the strength of the bond of the connected components. The latching mechanisms are designed to secure panels or other similar small and large mostly flat components. The latching method is done by a rotating component that takes all the separating load once rotated into the locked position. The rotatable lock, or hammer, is also locked itself into position to prevent accidental movement by the hammer.

14 Claims, 12 Drawing Sheets

MAGNET, PIN, AND SPRING ASSISTED LOCKABLE HORIZONTALLY AND VERTICALLY ALIGNING ERGONOMIC NOVEL LATCH MECHANISMS

BACKGROUND OF THE INVENTION

The field of this application is latching mechanism with the assistance of magnets and pins for assembling structures such as furniture and/or other flat panels and components. Previous implementations may be bulky, expensive, or require significant effort to engage and disengage, and do not always provide secure engagement. For example, one of the most compact devices in prior art is described by White (U.S. Pat. No. 5,678,948). While the device is small, the lever shown may require significant finger force on the part of the user. Alternatively, if a loose fit is provided in the latch described by White, accidental disengagement may occur. Other devices may offer different levels of user force and/or security, but they tend to be bulky and expensive.

SUMMARY OF THE INVENTION

The latch described in this application is used to secure flat panels quickly and with very minimum effort. The latching effectiveness is secure, and accidental disengagement is unlikely. Alignment of the panels is facilitated via the assistance of alignment pins and magnetic guides. When disassembly is desirable, the latch is quickly unlatched with minimum effort from the user. The latch is composed of three main parts, two frames and a rotatable hammer. The frames are sturdy generally rectangular components that are bolted on the edges of the panels that need to be secured. One of the frames has protruding pins that are inserted in cavities on the mating frame. Magnets in the hole help the user aligning the pins and holes. The engaged pins and holes define the relative location in two dimensions, while the location on the third dimension is defined by bottoming the pins. Then, the rotatable part called the hammer is rotated either 90 or 180 degrees by the users (or is rotated automatically in some embodiments) and locks the two frames (and therefore the panels) together. The hammer itself has locking mechanisms that prevent its accidental movement out of a latched position. The separation loads do not affect the locking mechanism that secures the hammer, which allows substantial resistance against unwanted separation, while unlocking and unlatching can be done with reduced effort.

LIST OF MAJOR COMPONENTS OR FEATURES

Figure 1:
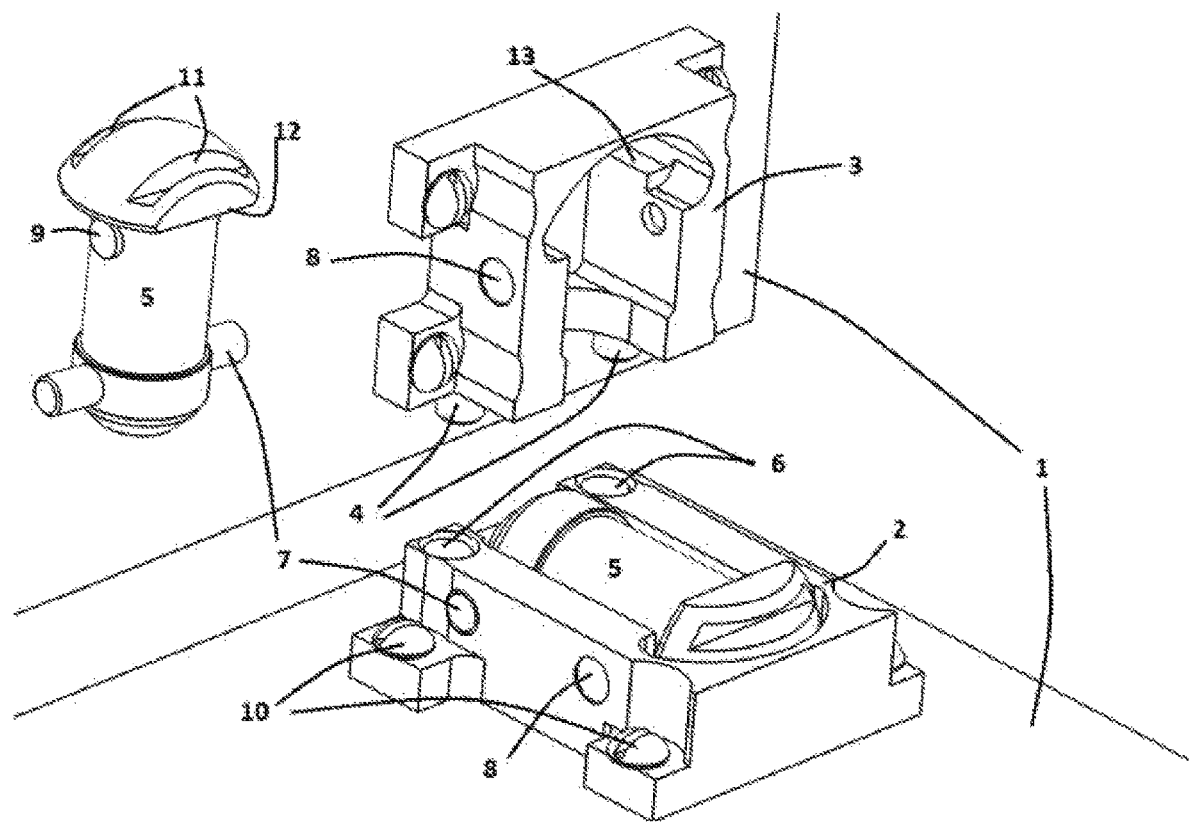
FIG. 1 shows the 90 degree manually operated latch in its unlatched position.

1. Panels that are secured
2. Primary Frame, the frame that encloses the hammer pivot
3. Secondary Frame, the frame that is engaged by the hammer to engage the latch
4. Alignment Pin on Secondary Frame
5. Hammer
6. Alignment Holes on Primary Frame
7. Main hammer pivot (shaft)
8. Stationary magnets
9. Magnets installed on Hammer
10. Mounting screws
11. Hammer Groove
12. Hammer Head
13. Magnetic Bolts
14. Torsion Spring for Hammer 5
15. Bracket for Torsion Spring 14 on Primary Frame 2
16. Cavity for Torsion Spring 14 on Hammer 5
17. Sheet Metal Hammer lock
18. Separation Springs
19. Locking Bolt Pin.
20. Locking Nut
21. Locking Spring
22. Hammer Ramp
23. Hammer Locking Hole
24. Locking Spring
25. Release Button
26. Release Pin

DETAILED DESCRIPTION

Figure 2:
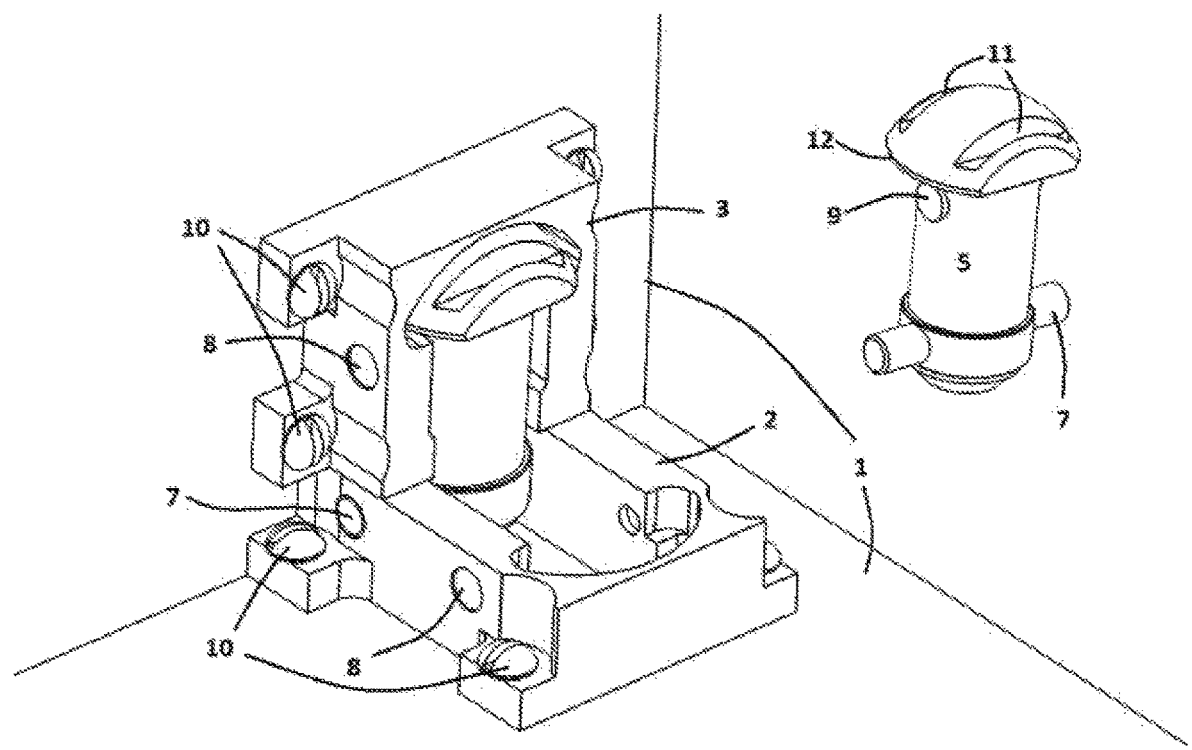
FIG. 2 shows the 90 degree manually operated latch in its latched position.

The first embodiment is a manually operated 90 degree latch (the panels engaged meet at right angles), where the movement of the hammer is done entirely by the user. This may be the lowest cost latch. FIG. 1 shows the latch and the two panels that will secure in the unlatched position. FIG. 2 shows the same latch and panels in the latched position. In both FIGS. 1 and 2, an additional hammer is shown so as the magnet installation on the hammer can be shown. In this embodiment, when the latch is unlatched, the hammer (a non-magnetic material, preferably metallic so that it is reasonably strong, and preferably light alloy such as aluminum) is mostly parallel to the Primary Frame 2 as shown in FIG. 1. The magnets installed on the hammer 9 are in proximity to the magnets 8 on the Frame 2 and therefore keep the hammer immobilized in that location. When the time comes to connect the two panels (1), the panels are brought together so that the alignment pins 4 get aligned with the holes 6 and the Primary Frame 2 and Secondary Frame 3 are brought in together as shown in FIG. 2. At that time, the user rotates the hammer by engaging the special grooves 11 and rotates the hammer 90 degrees against the magnetic force from the Primary Frame 2. But as the hammer approaches the position shown in FIG. 2, the magnetic force with the stationary magnet 8 on the secondary frame dominates and effectively secures the latch in the latched position. Specifically, the head of the hammer 12 engages two flat faces 13 on secondary frame 3 and prevents separation of the two frames. Now, the two panels 1 cannot be separated. If a disturbance tries to move the hammer out of position momentarily, the magnetic force will quickly return it back into the latched position. It needs to be noted that when the cylindrical magnets 8 and 9 are installed, special care is taken to ensure that the magnet poles (normally aligned in the direction of the axis of the magnet) have proper polarity so as to have attractive forces rather than repulsive forces.

Figure 3:
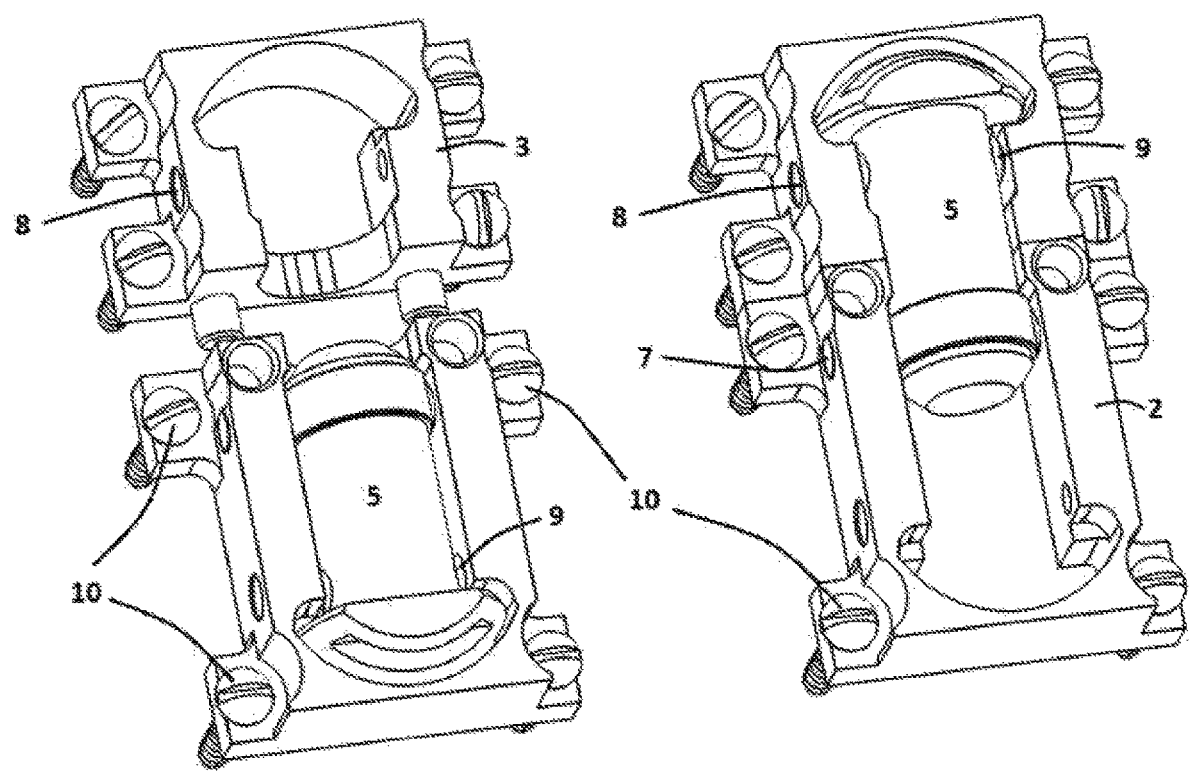
FIG. 3 shows the 180 degree manually operated latch in both unlatched and latched position.

The second embodiment is a variation of the above: the manually operated 180 degree latch. FIG. 3 shows the 180 degree manually operated latch in its unlatched position (left) and the latched position (right). The functions are identical, but the position is different. It needs to be pointed out that in the embodiment shown, the Primary Frame 2 has alignment holes 6 in two locations for accepting a secondary frame at right angles or at 180 degrees. Therefore, in FIG. 3, the active alignment holes 6 on the Primary Frame 2 are not visible in the angle shown, but are there nevertheless. This embodiment allows for the same primary frame to be used for both 90 and 180 degree latches. But this limitation is not necessary for the design to work.

Figure 4:
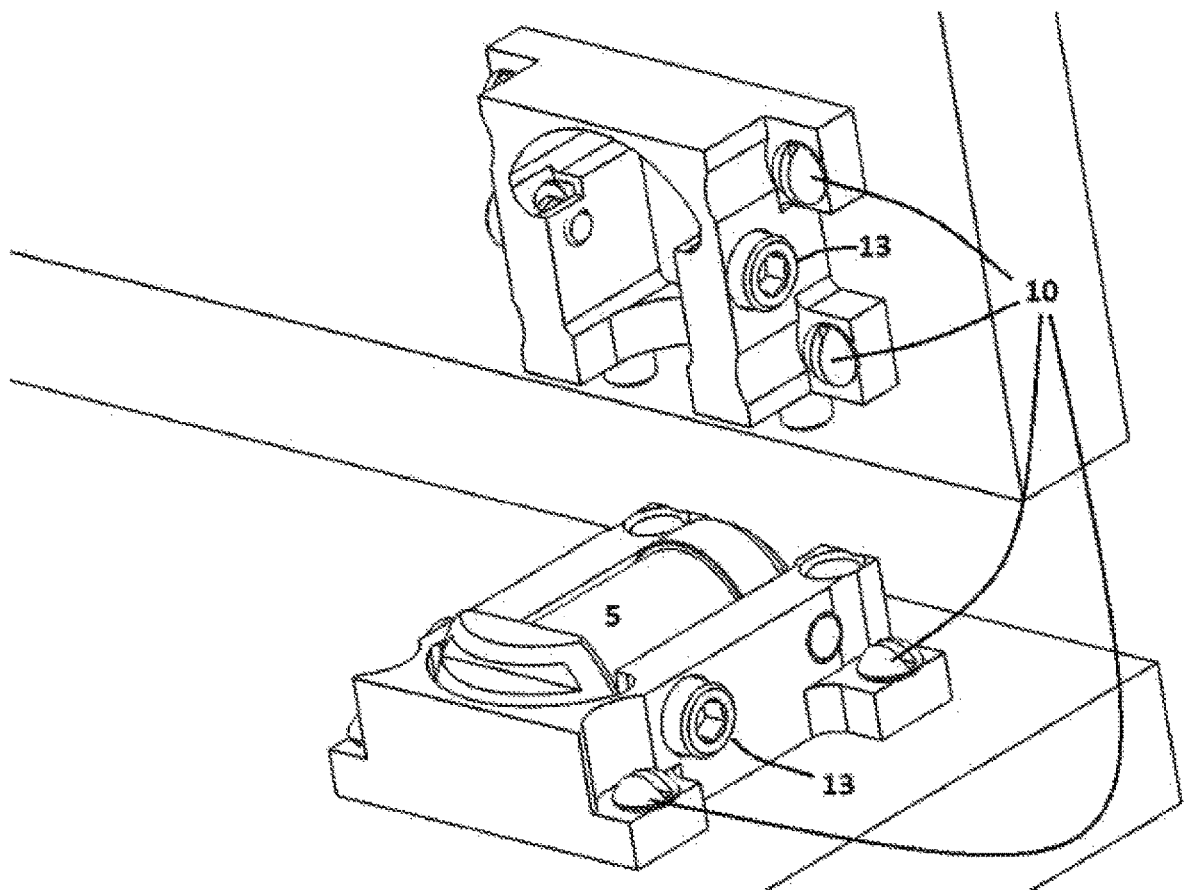
FIG. 4 shows the 90 degree latch where the stationary magnets are replaced by magnetic bolts.

Two more embodiments are as follows. The Stationary Magnets 8 are replaced with magnetic bolts 13, for both 90 and 180 degree latch. This is shown in FIG. 4. Note that FIG. 4 shows only the 90 degree latch (in its unlatched position), but the 180 degree version is obvious. The magnetic bolt 13 is simply a bolt made out of steel or other magnetic materials. The usefulness of this is that the cost may be lower as two magnets are replaced by bolts, and the assembly maybe easier as it is easier to tighten a bolt than secure a magnet. Obviously, there can be a reversal, and the magnets can be moved in the stationary position on the frame, while the magnetic bolts can be moved on the hammer.

Figure 5:
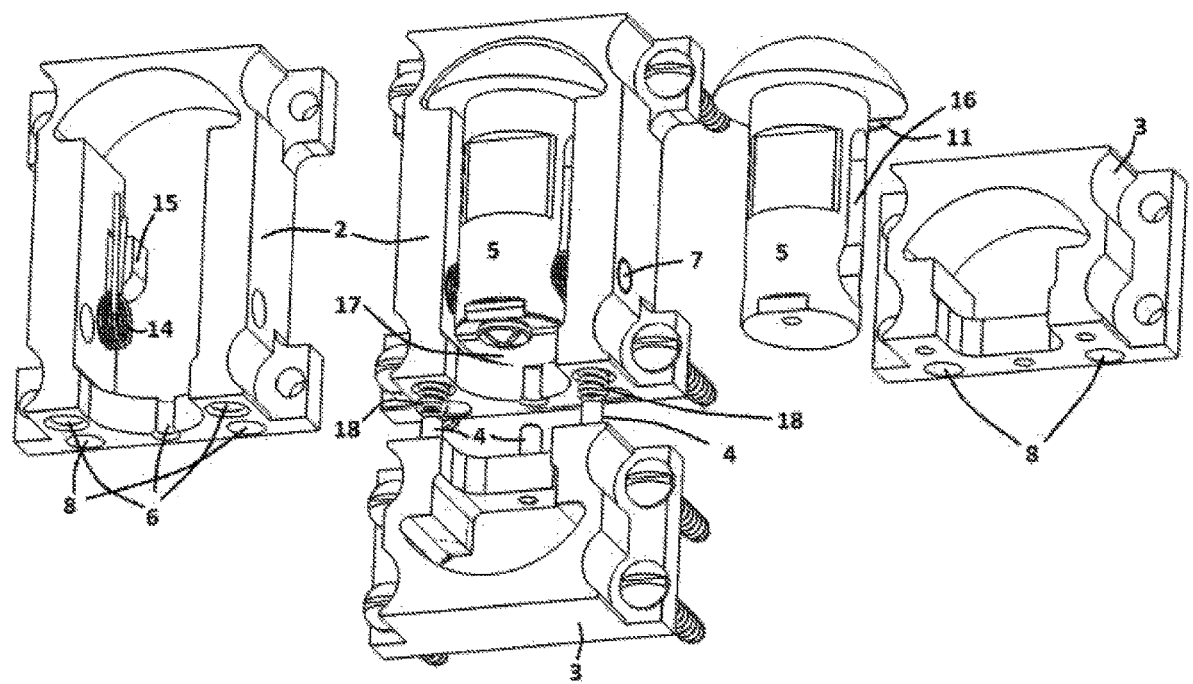
FIG. 5 shows the 180 degree automated latch with spring sheet metal lock and torsion springs.

The next embodiment is a more automated variation of the above latch, shown in FIG. 5. The latch shown in a 180 degree version in its unlatched position. An additional Primary Frame 2, Secondary Frame 3, and Hammer 5 have been inserted in the drawing in order to point out features that are not readily visible in the assembled latch. The main added feature in this latch are the two torsion springs 14 (the spring is shown in its wound state) that generate a torque on the hammer around hammer pivot 7 that tends to force the hammer in the latched position. The two torsion springs 14 (one is a mirror image of the other) fit in two special cavities on the hammer 16. Cavity 16 on the Hammer 5 contains the main body of the Torsion Spring 14 as well as one of its legs. The other leg sits on Special Bracket 15 on the primary frame. However, when the latch is in its unlatched position as shown in FIG. 5, the hammer is locked in its position by the Sheet Metal Hammer Lock 17. This part is a sheet metal component (preferably out of steel or spring steel) that is biased outwards and its edge interferes with areas of the Primary Frame 2, and thus prevents the hammer from rotating under the influence of the two Torsion Springs 14. Additionally, the Secondary Frame 3 is equipped with three Alignment Pins 4, the central of which is longer than the other two. When the user forces the two frames together, the longer central alignment pin 4 engages the Sheet Metal Hamer Lock 17 and compresses it inwards. The compressed sheet metal spring eventually is compressed sufficiently so that it no longer interferes with the area of the Primary Frame 2, and much like the hammer in a firearm trigger, the Hammer 5 is rapidly moved by the two Torsion Springs 14 into the latched position. Furthermore, the Primary Frame 2 is equipped with two Separation Springs 18 which are simple compression coil springs attached on the frame. The two external alignment pins 4 go through these springs, but the flat face of secondary Frame 3 compresses these springs as the user forces the two frames together. The purpose of these Separation Springs 18 becomes clear during the unlatching function of the latch. During that process, the user pulls the hammer manually (via Hammer Groove 11 also present in this embodiment) and the Separation Springs instantly generate a distance between the two frames. Then, the user forces the hammer (against the action of the Torsion Springs 14) into the unlatched position, and since the central alignment pin 14 has now been retracted, the Sheet Metal Hamer Lock 17 again locks the hammer in the unlatched position.

The embodiment of FIG. 5 has one additional important option. Referring again to FIG. 5, both frames 2 and 3 have stationary magnets 8 attached on them. These magnets help the user find the correct alignment position as he/she brings the two frames together. Therefore, even in situations where the user cannot clearly see the latch, the alignment can be nevertheless done without significant effort.

Figure 6:
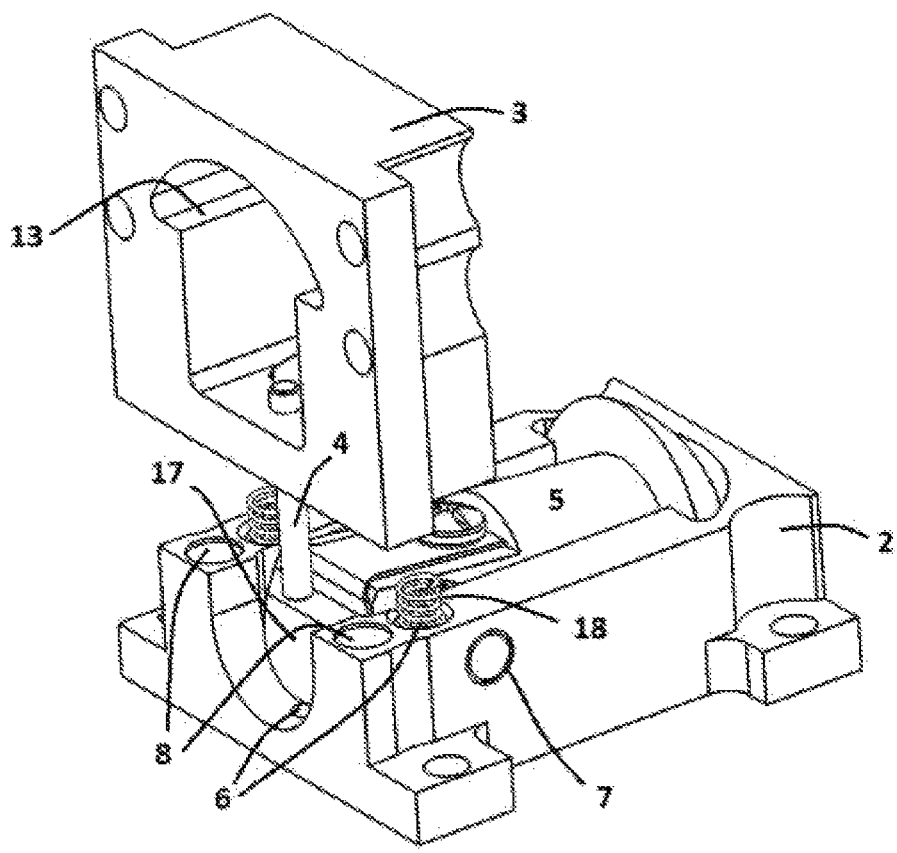
FIG. 6 shows the 90 degree automated latch with spring sheet metal lock and torsion springs.

FIG. 6 shows a similar concept to the embodiment of FIG. 5, but for the 90 degree latch. Again, two torsion springs (not visible in FIG. 6) are trying to rotate the hammer to the latched position, but again the Sheet Metal Lock 17 is preventing that until the user forces the three guide pins 4 (only central one visible from in FIG. 6) into the three guide holes 6, and in doing so the Sheet Metal Lock 17 is displaced, allowing the hammer to rotate into its latched position. Again, the unlatching process is similar, the user needing to rotate the hammer from the notch 11 on the hammer head (not visible in FIG. 16) and as soon as the hammer has moved away from flat 13 of Secondary Frame 3, the Separation Springs 18 will separate the two frames and allow the user to force the hammer into the unlatched position, and then the Sheet Metal Lock 17 will lock the hammer in that position.

The embodiment of FIG. 6 has one additional important option. Referring again to FIG. 6, both frames 2 and 3 have stationary magnets 8 attached on them (only the ones on the Primary Frame 2 are visible). These magnets help the user find the correct alignment position as he/she brings the two frames together. Therefore, even in situations where the user cannot clearly see the latch, the alignment can be nevertheless done without significant effort.

Figure 7:
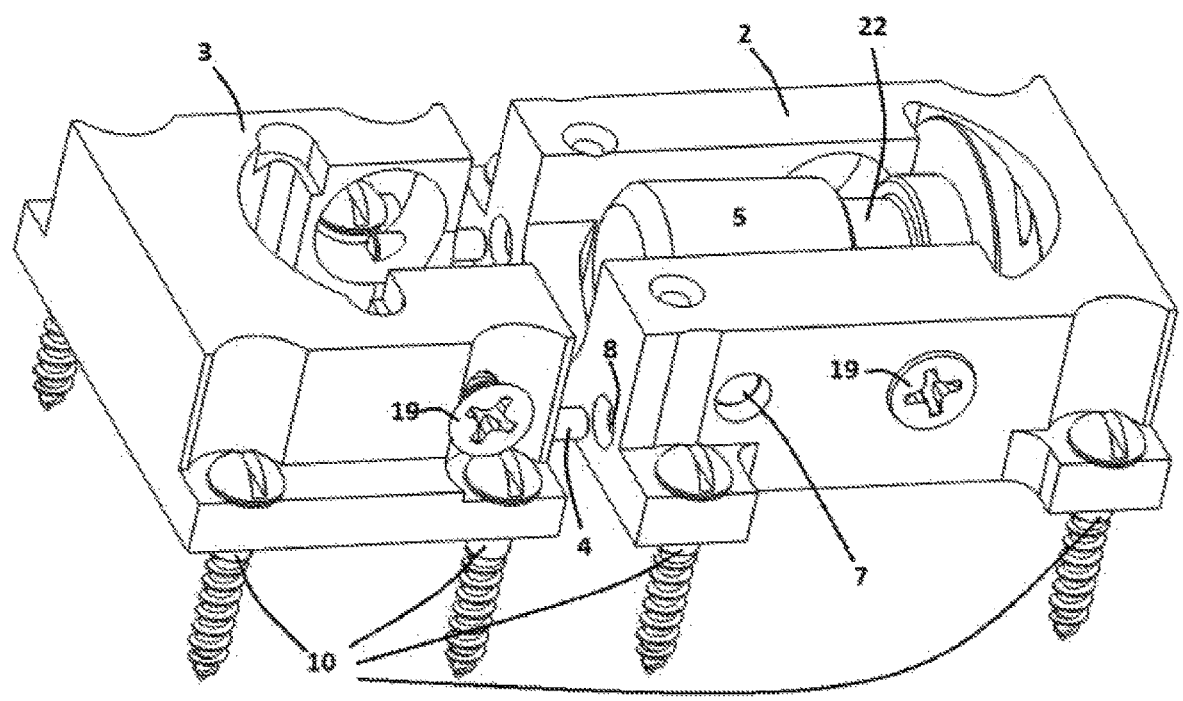
FIG. 7 shows the 180 degree manual latch with mechanical locks.
Figure 8:
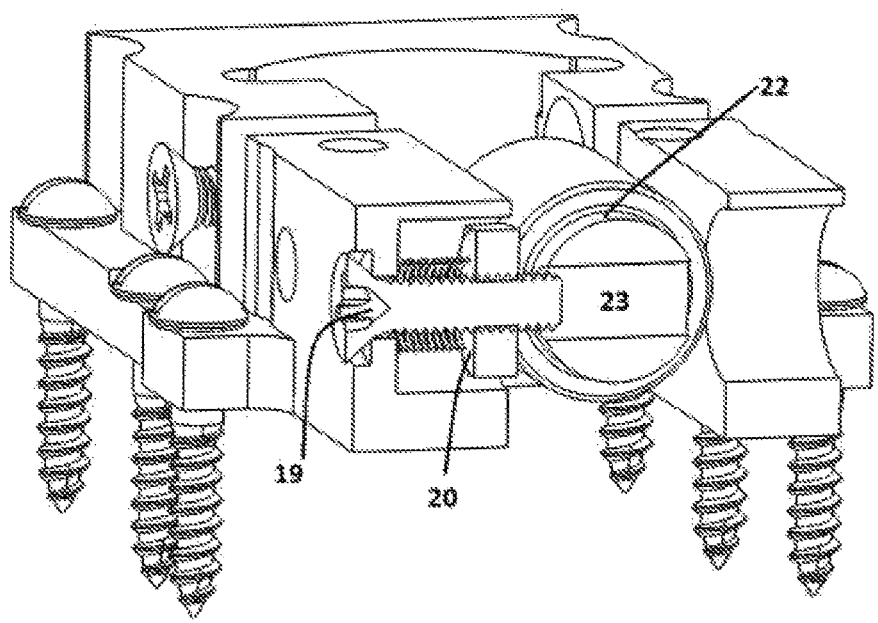
FIG. 8 shows a cross section of the latch of FIG. 7 in order to reveal the locking mechanism.

FIG. 7 shows another embodiment where the hammer movement is done by the user similarly to the manually operated one described earlier but the locking of the hammer is accomplished by mechanical means rather magnetically. Specifically, FIG. 7 shows the 180 degree latch in its unlatched position. All the major features, including the Primary Frame 2, the Secondary Frame 3, the Hammer 5, the alignment pins 4 (only two in this case), the alignment holes 8, the mounting bolts 10 are present. The hammer locking mechanisms for both latched and unlatched hammer locations are now mechanical. However, from FIG. 7, only two features of the locking mechanism are visible, the Locking Pin Bolt 19 and the Hammer Ramp 22. FIG. 8, however, shows a cross section of the same latch, revealing the remaining features of the mechanical locking mechanism, and its function. Locking Nut 20 is screwed into Locking Pin Bolt 19 up to a point in order to compress the Locking Spring 24. As the hammer is moved into position by the user, the Hammer Ramp 22 engages Locking Pin Bolt 19 and compresses the Locking Spring 24 further in order to push the Locking Pin Bolt 19 out of the way. Eventually, the Hammer Locking Hole 23 will reach the Locking Pin Bolt 19 and the spring will insert the latter into the hole. This will complete the locking process. FIG. 8 shows locking into the unlatched position, but the process and features are identical for the latched position. In order for the hammer to be unlocked and moved, the Locking Pin Bolt 19 will have to be pulled out by the user while the user also is moving the hammer. It needs to be noted that the Locking Pin Bolt 19 does not necessarily need to be a bolt, and the Locking Nut does not have to be a threaded nut. Any type of pin that a flange can be secured to provide the reaction on the compression spring 24 will work. A bolt and nut is used here simply due to their availability.

A similar embodiment to the one shown in FIGS. 7 and 8 can also be fabricated, but for a 90 degree latch. In fact, the components described in FIGS. 7 and 8 can be used with little or no modification for the 90 degree latch as additional alignment holes and pin holes are provided. It is assumed that the embodiment is obvious, and therefore no additional figures are provided to illustrate this.

The embodiment of FIG. 7 has one additional important option. Both frames 2 and 3 have stationary magnets 8 attached on them (not shown in FIG. 7 but similar to the ones shown in FIG. 5). These magnets help the user find the correct alignment position as he/she brings the two frames together. Therefore, even in situations where the user cannot clearly see the latch, the alignment can be nevertheless done without significant effort.

Figure 9:
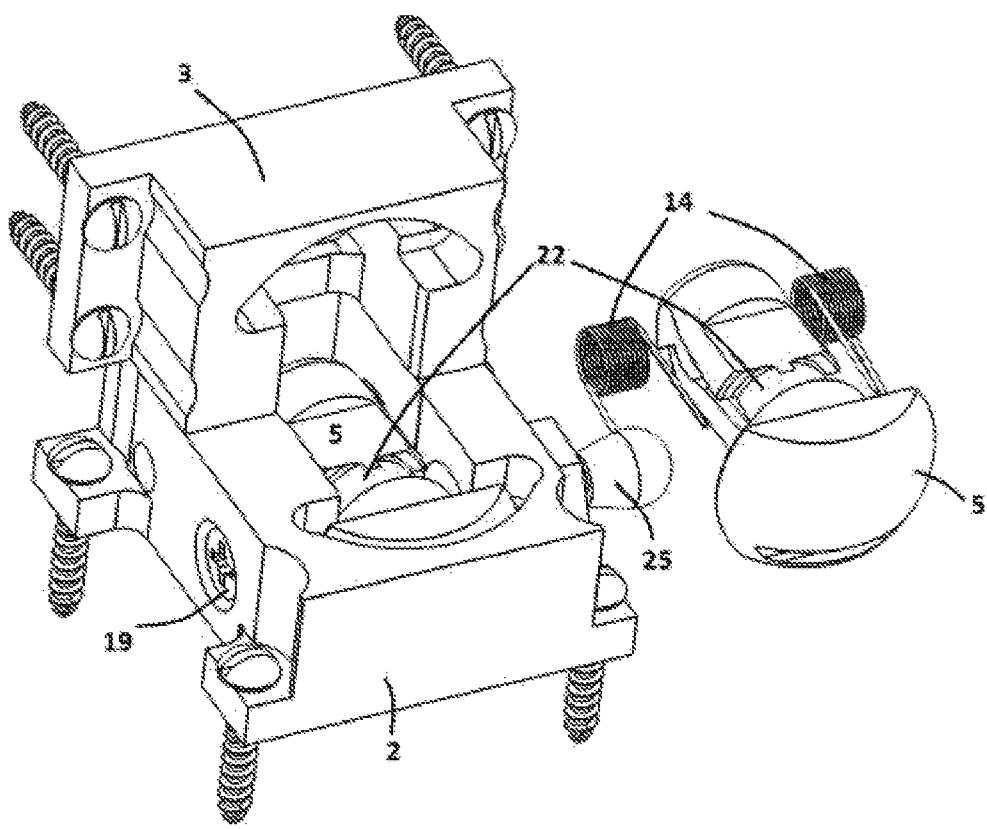
FIG. 9 shows the 90 degree automated latch with ergonomically efficient mechanical lock and torsion springs for the hammer.
Figure 10:
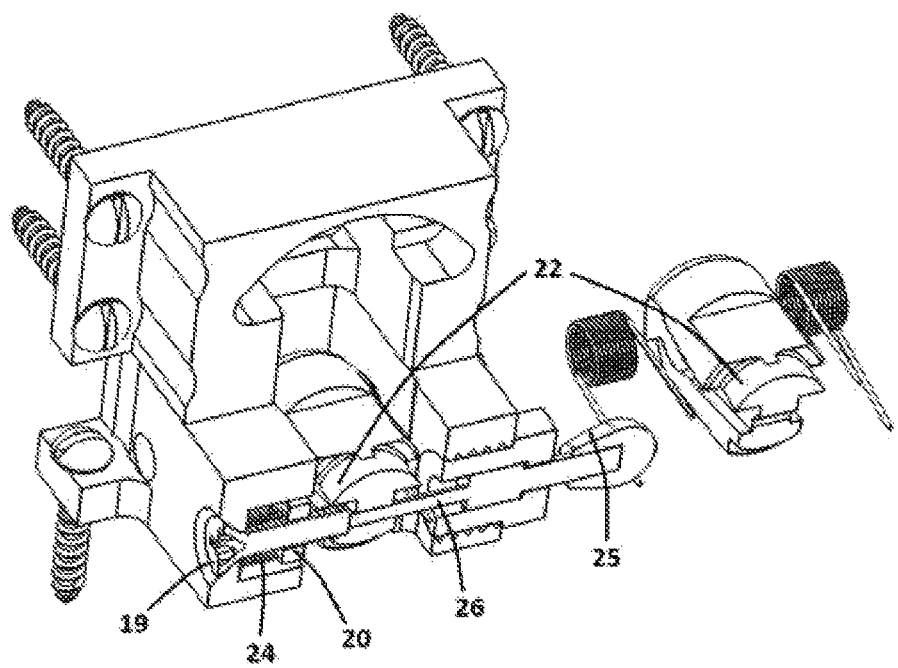
FIG. 10 shows a cross section of the Latch of FIG. 9 in order to reveal the ergonomically efficient locking mechanism.

FIG. 9 is an embodiment that combines the features of the embodiment shown in FIG. 5 (where the hammer is activated by torsion springs) and features of the embodiment shown in FIG. 7 (mechanical locking method). FIG. 9, that shows the latch in its unlatched position, also illustrates an additional Hammer 5 and an additional set of Torsion Springs 14 outside of the main assembly in order to illustrate the concept. The torsion springs 14 (shown in their wound state) are applying a torque on Hammer 5 that is trying to rotate the hammer into the latched position. However, the locking mechanism, with Locking Pin Bolt 19 and other components that are not visible in FIG. 9 prevent the hammer from moving. FIG. 10 shows a cross section of the mechanism of FIG. 9 right on the center plane of the locking mechanism. Again, Spring 24 and Nut 20 keep the Pin Bolt 19 biased to the right (as seen in FIG. 10), forcing the Pin Bolt 19 edge inside a special cavity in Hammer 5 (not visible from FIG. 10) preventing its release. The user is still expected to align the Alignment Pins 4 with Alignment Holes 6 and mate the pins in the holes (not visible, FIG. 9 assumes shows the latch right after this step is completed). One addition of the embodiment of FIGS. 9 and 10 is that the release of the hammer is now easier since the user just needs to depress Release Button 25 which causes Release Pin 26 to move to the left and push Locking Pin Bolt 19 out of the way, releasing the hammer. This extra complication allows for a more ergonomic hammer release than the one shown in the embodiment of FIGS. 7 and 8, but the hammer release could certainly be the simpler version of FIGS. 7 and 8. When the user depresses Release Button 25, the hammer is automatically rotated into the latched position. When the user needs to unlatch it, the procedure and mechanism is similar to the embodiment of FIGS. 7 and 8. The Hammer Ramp 22 again will push the Pin Bolt 19 out of the way temporarily and allow the hammer to retract until the Spring 24 forces the Locking Pin Bolt 19 in the locked position.

Figure 11:
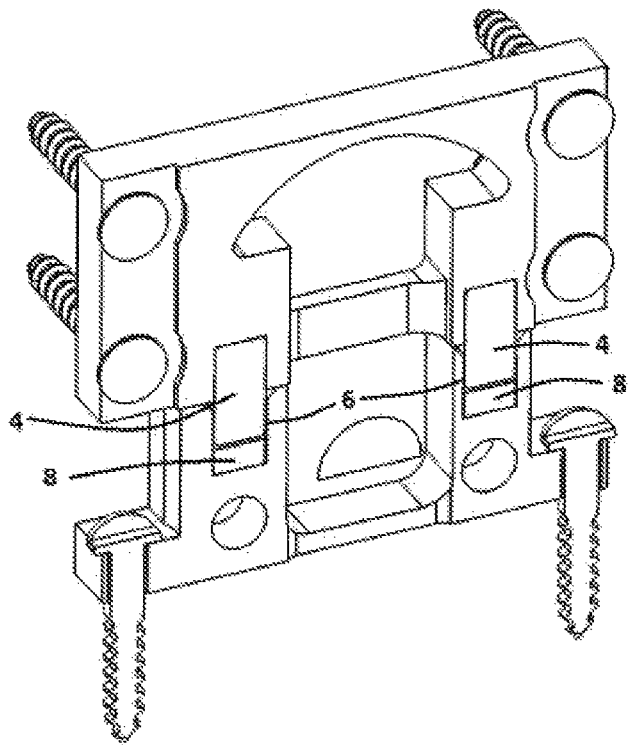
FIG. 11 shows an alternative magnetic guidance for alignment pins via a cross section, in this case as applied to the latch of FIG. 9.

FIG. 11 shows an additional option for the embodiment of FIGS. 9 and 10. FIG. 10 shows a cross section along the plane of the Alignment Pins 4 and Alignment Pins 6. In this embodiment, stationary magnets 8 are secured in the bottom of Alignment Holes 6, which allow the easy alignment of the pins and holes. This approach requires that the Alignment Pins 4 are built from a magnetic material such as steel.

Figure 12:
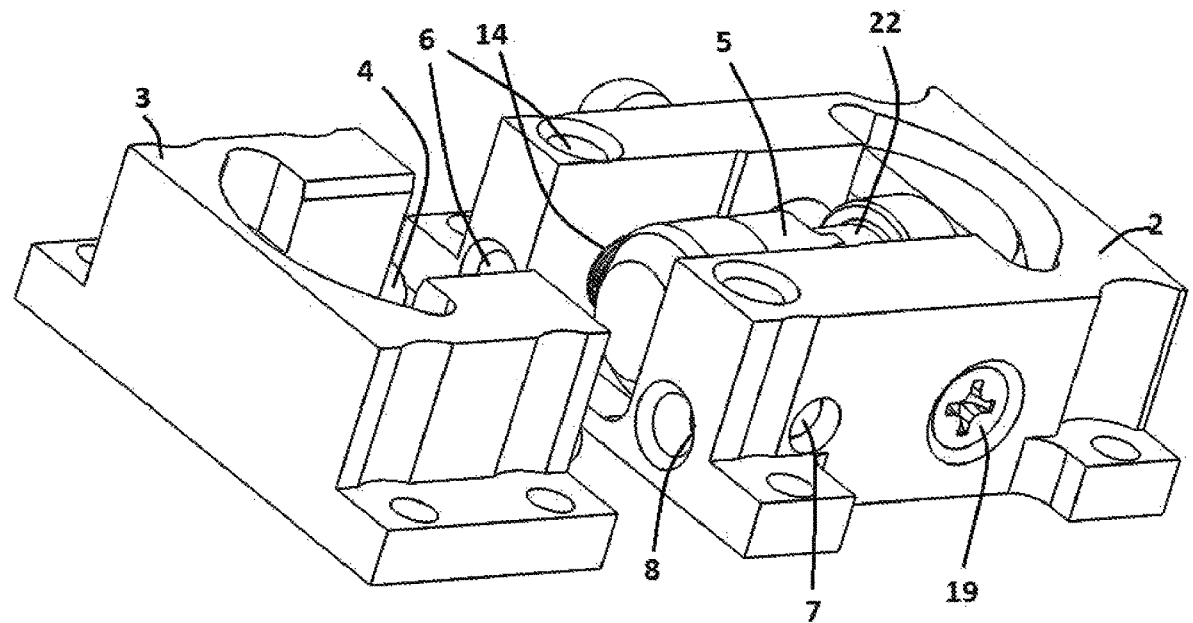
FIG. 12 shows the 180 degree automated latch with ergonomically efficient mechanical lock ad torsion springs for the hammer

FIG. 12 shows the latch mechanism of FIG. 9 but for a 180 degree latch. All the features are identical to the Latch of FIG. 9, except for the fact that the latch mechanism is engaged at 180 degrees. One of the magnetic assistance Stationary Magnet 8 is barely visible from the angle of FIG. 9. One novelty of the parts shown in FIG. 9 is that the same parts can be used for both a 90 degree and a 180 degree latch. Therefore, additional or redundant alignment holes 6 are present in FIG. 12, but the reason of the redundancy is if the part is used for a 90 degree latching purpose. This option of double use can apply to the latch mechanisms presented, and a benefit is that the logistical cost of providing different parts for different needs can be eliminated or minimized.

In FIGS. 1, 2, 3, and 4, the mounting screws 10 are shown and labeled. However, mounting screws is not the only way that the latches can be secured on the panels. Epoxy resin can be used to secure the latch frames on the brackets instead. A benefit of this is that the installation brackets are not needed, giving the frames a cleaner look and also reducing their necessary foot print size on the panels.

What is claimed is:

1. A system for fastening panels, comprising:
   a latch mechanism, comprising:
   at least one primary frame attached proximate a first edge of a first panel,
   at least one secondary frame attached proximate a second edge of a second panel,
   a rotatable hammer pivoted on the at least one primary frame, a wide end of the hammer engaging at least one flat surface on the at least one secondary frame and preventing separation of the first panel and the second panel,
   at least one alignment pin on the first frame and at least one alignment hole on the second frame, the pin and the hole allowing alignment in two dimensions, and
   at least one magnet attached to the hammer and one of at least one magnet and at least one magnetic bolt attached on each of the first frame and the second frame,
   wherein the hammer rotates on a main hammer pivot positioned at the first edge and parallel to the first edge and the hammer rotates one of 90 degrees and 180 degrees in a direction perpendicular to the first edge to magnetically and externally attach to an outward-facing surface of the secondary frame.

2. The system of claim 1, wherein magnetic forces of the magnets prevent accidental movement of the hammer from one of locked and unlocked position.

3. The system of claim 1, wherein the mechanism fastens panels at one of a right angle and a 180 degree angle.

4. The system of claim 1, wherein at least one magnetic bolt is alternatively attached on each of the first and second frame.

5. The system of claim 1, wherein alternative to attachment of the magnets to the hammer and the frames, one spring loaded locking pin is provided on each frame that locks the hammer into position when aligned with the locking pin.

6. The system of claim 5, wherein a ramp on the hammer displaces the pin and compresses the spring of the pin as the hammer is moved proximate one of a latched and unlatched position, and further provides for the pin to be accessible and thereby facilitate pulling of the spring loaded locking pin out of locked position and movement of the hammer thereafter.

7. The system of claim 1, wherein epoxy resin secures the at least one first frame and the at least one second frame on the first and second panels, respectively, in place of mounting screws.

8. The system of claim 1, wherein the at least one alignment pin is alternatively on the second frame and the at least one alignment hole is on the first frame, the pin and the hole facilitating alignment in two dimensions.

9. A system for fastening panels, comprising:
at least one latch mechanism, comprising:
at least one primary frame attached proximate a first edge of a first panel,
at least one secondary frame attached proximate a second edge of a second panel,
a rotatable hammer pivoted on the at least one primary frame, a wide end of the hammer engaging at least one flat surface on the at least one secondary frame and preventing separation of the first panel and the second panel, at least one alignment pin on the first frame and at least one alignment hole on the second frame, the at least one alignment pin and the at least one alignment hole allowing alignment in two dimensions, and
at least one magnet on the second frame directed to attracting the alignment pin,
wherein the hammer rotates on a main hammer pivot positioned at the first edge and parallel to the first edge and the hammer rotates one of 90 degrees and 180 degrees in a direction perpendicular to the first edge to magnetically and externally attach to an outward-facing surface of the secondary frame.

10. The system of claim 9, wherein epoxy resin secures the at least one first frame and the at least one second frame on the first and second panels, respectively, in place of mounting screws.

11. The system of claim 9, wherein the mechanism fastens panels at one of a right angle and a 180 degree angle.

12. The system of claim 9, wherein the at least one alignment pin is alternatively on the second frame and the at least one alignment hole is on the first frame, the pin and the hole allowing alignment in two dimensions.

13. The system of claim 12, wherein the at least one magnet on the first frame is directed to attracting the alignment pin.

14. The system of claim 9, wherein the first panel and the second panel are flat.

* * * * *